United States Patent
Bohne et al.

(10) Patent No.: US 8,109,809 B2
(45) Date of Patent: Feb. 7, 2012

(54) ECCENTRIC TRANSMISSION WITH AN IMBALANCE

(75) Inventors: Ulrich Bohne, Kohlberg (DE); Joerg Lemmel, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 10/561,286

(22) PCT Filed: Aug. 22, 2005

(86) PCT No.: PCT/EP2005/054119
§ 371 (c)(1),
(2), (4) Date: Dec. 20, 2005

(87) PCT Pub. No.: WO2006/042767
PCT Pub. Date: Apr. 27, 2006

(65) Prior Publication Data
US 2007/0094877 A1  May 3, 2007

(30) Foreign Application Priority Data
Oct. 19, 2004   (DE) .................... 10 2004 050 800

(51) Int. Cl.
*B24B 23/04* (2006.01)
(52) U.S. Cl. ................. 451/357; 74/50; 451/344
(58) Field of Classification Search .......... 451/343, 451/24, 357, 514, 431, 356; 74/47, 48, 49, 74/50; 30/219
See application file for complete search history.

(56) References Cited

U.S. PATENT DOCUMENTS

| | | | | |
|---|---|---|---|---|
| 2,639,737 A | | 5/1953 | Forsberg | |
| 2,746,493 A | * | 5/1956 | Babcock | 30/394 |
| 3,592,091 A | * | 7/1971 | Ottavan | 83/879 |
| 3,644,111 A | * | 2/1972 | Becker | 65/158 |
| 3,863,342 A | * | 2/1975 | Griffies et al. | 30/393 |
| 4,344,332 A | | 8/1982 | Schuricht | |
| 4,512,078 A | * | 4/1985 | Pfanzer | 30/393 |
| 4,784,045 A | * | 11/1988 | Terauchi | 92/71 |
| 5,022,157 A | * | 6/1991 | Chang | 30/394 |
| 5,134,777 A | * | 8/1992 | Meyer et al. | 30/392 |
| 5,644,846 A | * | 7/1997 | Durr et al. | 30/393 |
| 5,947,804 A | * | 9/1999 | Fukinuki et al. | 451/357 |
| 6,273,799 B1 | * | 8/2001 | Pedrini | 451/159 |
| 6,357,579 B1 | * | 3/2002 | Patterson et al. | 198/766 |
| 6,625,892 B2 | * | 9/2003 | Takahashi et al. | 30/393 |
| 6,820,339 B2 | * | 11/2004 | Albrightson | 30/392 |
| 7,029,384 B2 | * | 4/2006 | Steimel et al. | 451/342 |
| 7,143,705 B2 | * | 12/2006 | Frazer et al. | 112/117 |
| 7,350,302 B2 | * | 4/2008 | Imai et al. | 30/393 |
| 2002/0032968 A1 | * | 3/2002 | Takahashi et al. | 30/392 |
| 2002/0185288 A1 | * | 12/2002 | Hanke et al. | 173/201 |
| 2004/0082283 A1 | * | 4/2004 | Lindell et al. | 451/343 |
| 2005/0178307 A1 | * | 8/2005 | Frazer et al. | 112/117 |

* cited by examiner

*Primary Examiner* — Timothy V Eley
(74) *Attorney, Agent, or Firm* — Michael J. Striker

(57) ABSTRACT

An eccentric transmission having an imbalance compensation element (10a-10e) and having an eccentric element (12a-12e) for converting a revolving rotary motion of an armature shaft (14a-14e) into an oscillating rotary motion of a drive shaft (16a-16e) in order to drive an insert tool (40a-40e) of a hand-held power tool (18a-18e) to oscillate.
The imbalance compensation element (10a-10e) is integral to another functional unit (12a-12d, 14e).

25 Claims, 5 Drawing Sheets

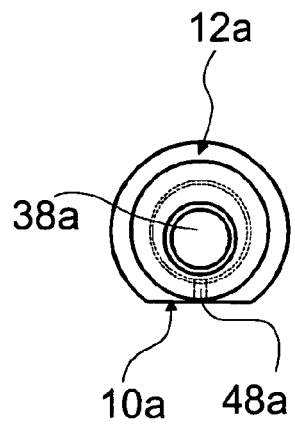 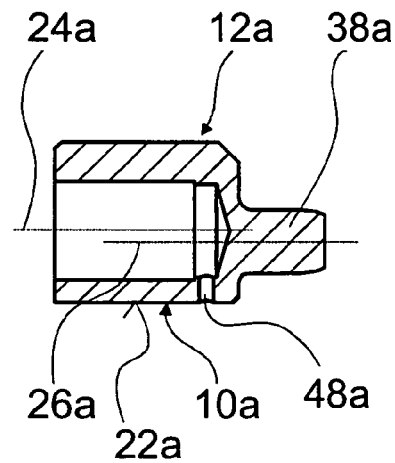 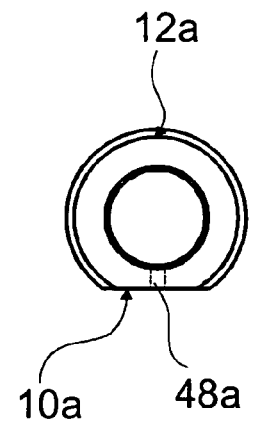
Fig. 3a  Fig. 3b  Fig. 3c
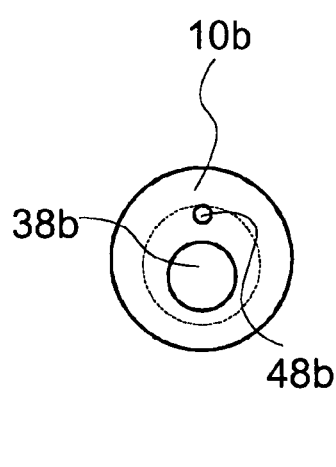 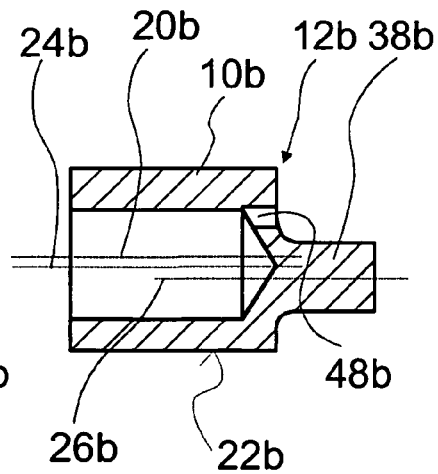 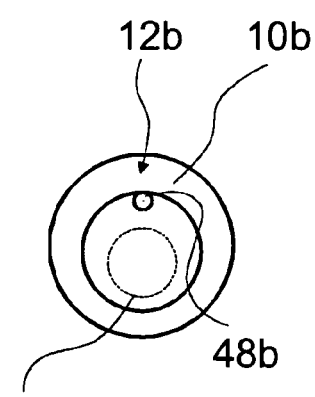
Fig. 4a  Fig. 4b  Fig. 4c

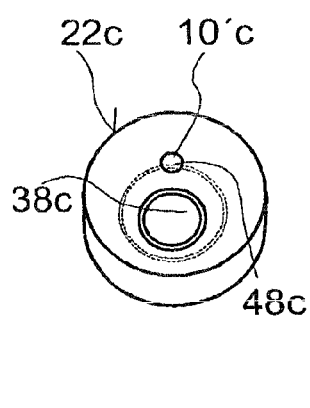 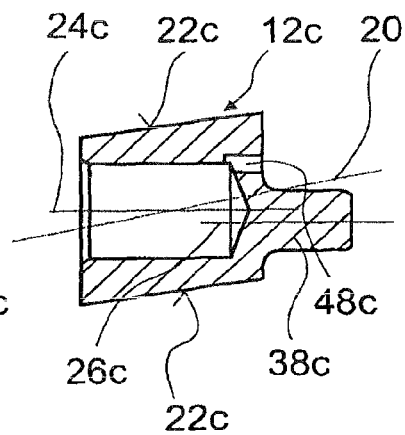 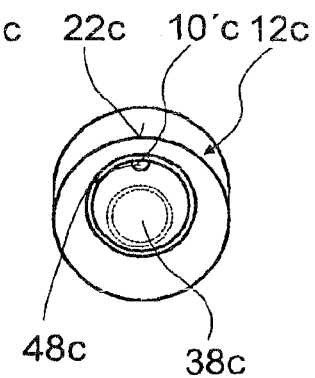
Fig. 5a Fig. 5b Fig. 5c
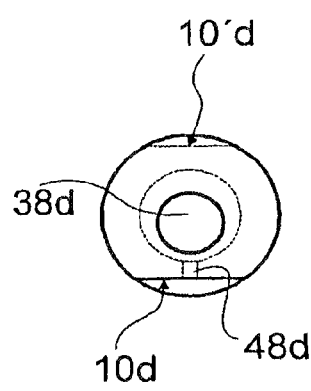 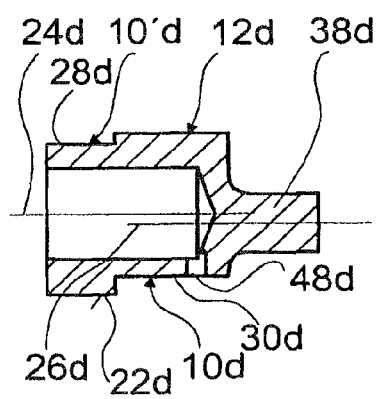 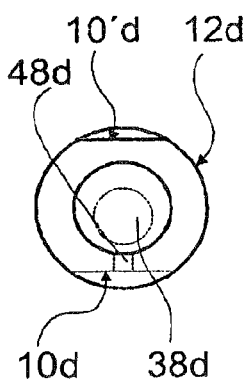
Fig. 6a Fig. 6b Fig. 6c

ECCENTRIC TRANSMISSION WITH AN IMBALANCE

CROSS-REFERENCE

The invention described and claimed hereinbelow is also described in PCT/EP 2005/054119, filed on Aug. 22, 2005 and DE 102004050800.3, filed on Oct. 19, 2004. This German Patent Application, whose subject matter is incorporated here by reference, provides the basis for a claim of priority of invention under 35 U.S.C. 119 (a)-(d).

BACKGROUND OF THE INVENTION

The present invention is based on an eccentric transmission with an imbalance compensation element.

The prior art already includes proposals to equip a hand-held power tool with an eccentric transmission that is provided to convert a revolving rotary motion of an armature shaft into an oscillating rotary motion of a drive shaft in order to drive an insert tool of the hand-held power tool to oscillate. Known eccentric transmissions have disk-shaped imbalance compensation elements that are slid or press-fitted onto the drive shaft.

SUMMARY OF THE INVENTION

The present invention is based on an eccentric transmission with an imbalance compensation element and with an eccentric element for converting a revolving rotary motion of an armature shaft into an oscillating rotary motion of a drive shaft in order to drive an insert tool of a hand-held power tool to oscillate.

According to the invention, the imbalance compensation element is integral to an additional functional unit. This makes it possible to reduce the number of components and save on production costs and also permits the ruggedness of the eccentric transmission to be increased. This also has the capacity to advantageously eliminate error sources in an assembly process.

In the context of this application, the term "eccentric element" is understood to indicate a device with a drive element situated eccentric to a rotation axis, in particular a drive pin, which, in a particularly advantageous embodiment, can have two offset axes parallel to each other. The imbalance compensation element generates a compensation imbalance that is situated opposite from and thus compensates for an imbalance generated by the eccentric element and by eccentrically rotating components connected to it.

In particular, an error in the relative orientation of the eccentric element and the imbalance compensation element can be avoided if the additional functional unit is the eccentric element.

An inexpensive manufacture of the imbalance element can be achieved if the imbalance compensation element includes a recess. In this connection, the imbalance compensation element can in particular be embodied in the form of a rotationally symmetrical component in which the recess is subsequently produced in order to generate an imbalance. If the eccentric element has a drive pin, the recess can be oriented in the same direction as the drive pin. A particularly precise dimensioning of the imbalance can be achieved if the imbalance compensation element contains a bore. As a result, it is also possible to achieve a quiet movement of the imbalance compensation element if it has a rotationally symmetrical outer casing that covers the—in particular axially oriented—bore.

Edges that could generate running noise can be avoided and a particularly compact design can be achieved if the imbalance compensation element is comprised of an outer casing of the eccentric element. This can be implemented in a particularly advantageous way by means of an axis of the outer casing that is offset in parallel fashion in relation to a rotation axis of the eccentric element or in relation to a driving element.

A tilting moment perpendicular to the rotation axis of the eccentric element and/or of the armature shaft can be advantageously compensated for if one axis of the outer casing is tilted in relation to at least one axis of the eccentric element.

An inexpensive eccentric transmission with compensation of components of a turning moment and/or tilting moment oriented perpendicular to the rotation axis can be achieved if the imbalance compensation element has a cross section that changes in the axial direction. In this connection, a particularly precisely tuned imbalance compensation element can be achieved if the imbalance compensation element has at least two axially offset regions that have different imbalances.

There are also conceivable embodiments in which the additional functional unit integral to the imbalance compensation element is the armature shaft. This makes it possible to achieve an eccentric element that has a high degree of symmetry and is inexpensive to manufacture.

An effective imbalance compensation element can be achieved for a particularly low engineering cost if the imbalance compensation element includes a lateral flattened region on the armature shaft.

There are also conceivable embodiments in which several separate imbalance compensation elements are provided, which are integrated into different functional units. Then, a relative orientation of the imbalance compensation elements can be advantageously selected so as to compensate for a tilting moment.

BRIEF DESCRIPTION OF THE DRAWINGS

Other advantages ensue from the following description of the drawings. The drawings depict exemplary embodiments of the invention. The drawings, description, and claims contain numerous defining characteristics in combination. Those skilled in the art will also suitably consider the defining characteristics individually and unite them into other meaningful combinations.

FIGS. 5a-5c show a front view, a sectional view, and a rear view of another alternative eccentric element of an eccentric transmission, FIGS. 6a-6c show a front view, a sectional view, and a rear view of another alternative eccentric element of an eccentric transmission.

DETAILED DESCRIPTION OF THE EXEMPLARY EMBODIMENTS

Figure 1:
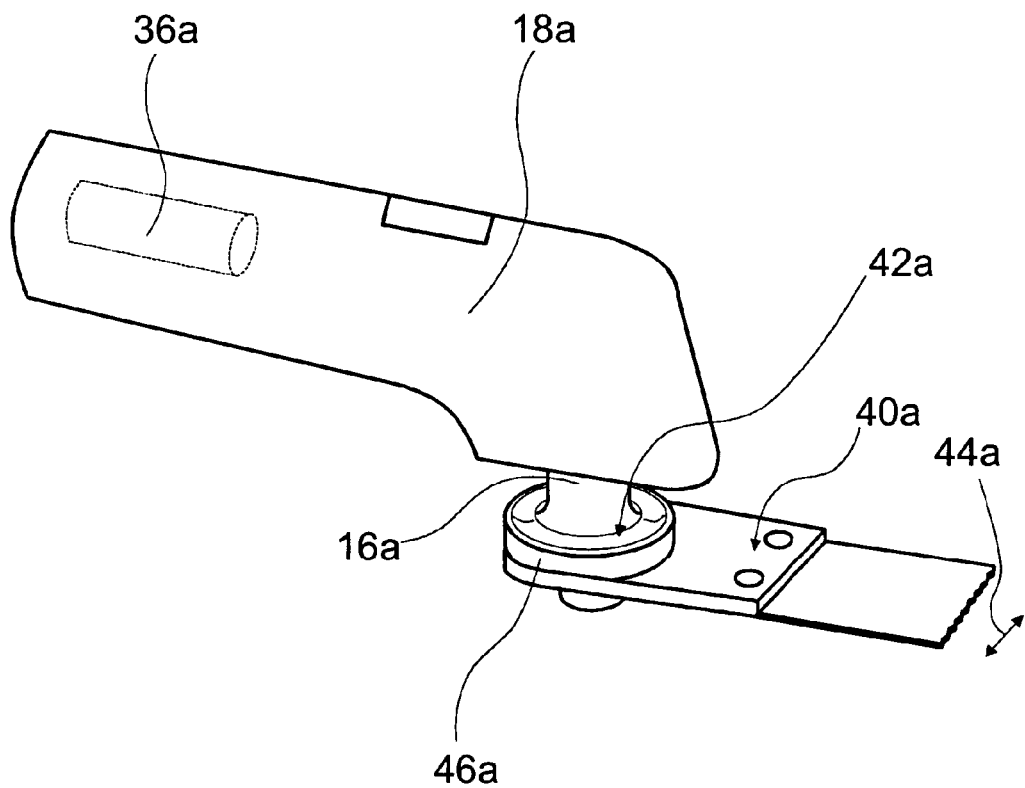
FIG. 1 shows a hand-held power tool with a drive shaft that can be driven to oscillate.
Figure 2:
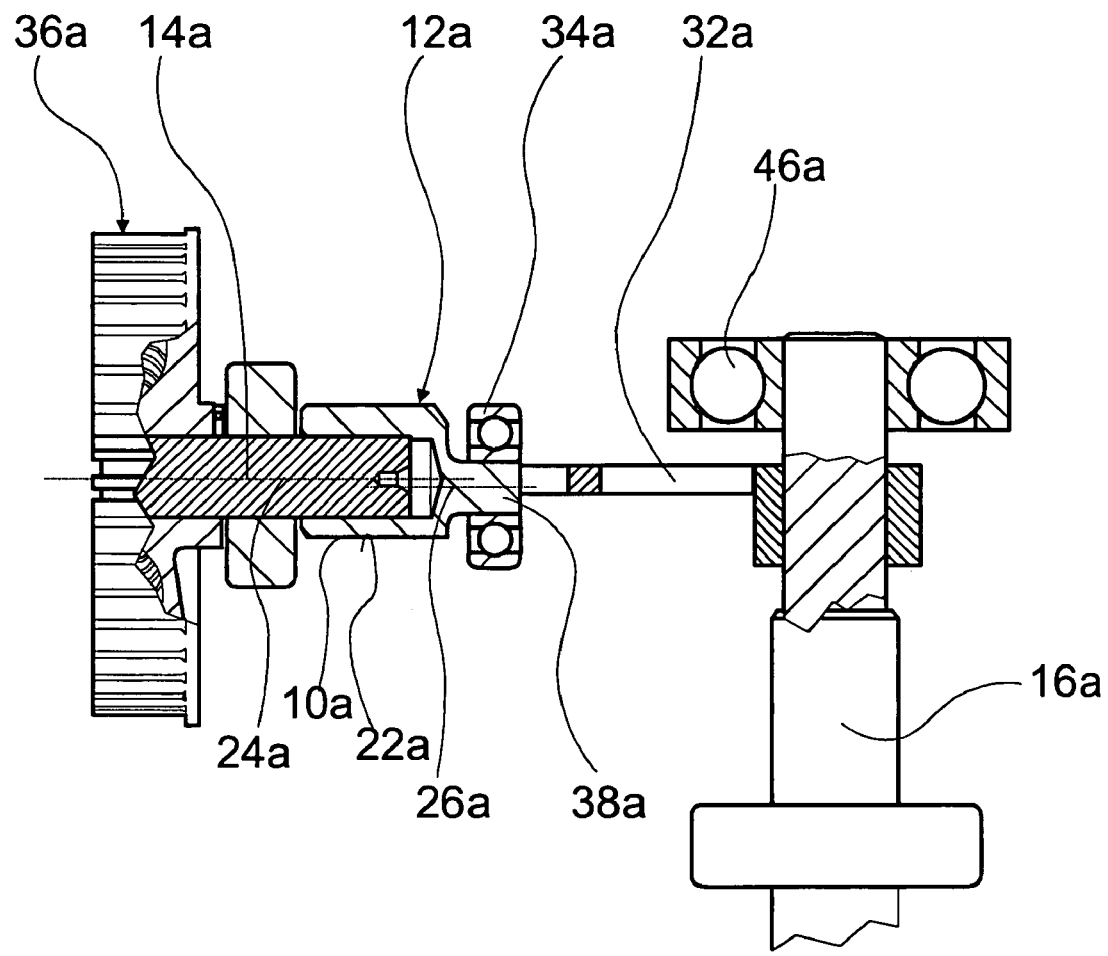
FIG. 2 shows an eccentric transmission of the hand-held power tool from FIG. 1, FIGS. 3a-3c show a front view, a sectional view, and a rear view of an eccentric element of the eccentric transmission from FIG. 2, FIGS. 4a-4c show a front view, a sectional view, and a rear view of an alternative eccentric element of an eccentric transmission.

FIG. 1 shows a hand-held power tool 18a with an electric motor 36a contained in a housing (FIG. 2). By means of an eccentric transmission, the electric motor 36a sets a drive shaft 16a protruding from the housing into oscillation. During operation, the drive shaft 16a pivots back and forth by several degrees in an oscillating fashion. At its end protruding from the housing, the drive shaft 16a has a fastening device 42a to which an insert tool 40a can be attached in a nonrotating fashion. The fastening device 42a acts as a clamping connection in the axial direction. The oscillating motion of the drive shaft 16a is converted into an oscillating pivoting motion 44 of the insert tool 40a.

FIG. 2 shows the eccentric transmission of the hand-held power tool 18a. In order to convert the revolving rotary motion of an armature shaft 14a, which the electric motor 36a generates, into the oscillating rotary motion of the drive shaft 16a, an eccentric element 12a is press-fitted onto the armature shaft 14a of the electric motor 36a.

The eccentric element 12a has a rear region containing a bore, which is provided to receive one end of the armature shaft 14a. In the front region, the eccentric element 12a has a cylindrical drive pin 38a. An axis 26a of the drive pin 38a is offset eccentrically and/or in parallel fashion to an axis 24a of the bore so that a rotary motion of the armature shaft 14a generates an eccentric rotary motion of the drive pin 38a.

A ball bearing 34a is slid onto the drive pin 38a. An oscillating link 32a of the eccentric transmission is fork-shaped, rests against both sides of an outer circumference of the ball bearing 34a, and is nonrotatably connected to the drive shaft 16a. An orbital motion of the ball bearing 34a generates to oscillating pivoting motion of the oscillating link 32a. The pivoting motion of the oscillating link 32a is transmitted to the drive shaft 16a, which is supported in the housing of the hand-held power tool 18a by means of a ball bearing 46a, and converts this motion into the pivoting motion 44a of the insert tool 40a.

The eccentric element 12a has a recess embodied in the form of a flattened area, which constitutes an imbalance compensation element 10a and is integral to the eccentric element 12a (FIGS. 3a-3c). The imbalance compensation element 10a is aligned in the direction in which the drive pin 38a is offset from the axis 24a. The imbalance compensation element 10a is dimensioned so that a center of mass of a total system comprised of the eccentric element 12a and the ball bearing 34a lies on the axis 24a of the armature shaft 14a.

In the region of an end face of the bore in the rear region of the eccentric element 12a, the eccentric element 12a has an air compensation opening 48a through which air can escape from the bore when the eccentric element 12a is being press-fitted onto the armature shaft 14a.

FIGS. 4-6 show alternative embodiments of an eccentric element 12a-12e, each with an integrated imbalance compensation element 10a-10e. The description below will primarily concentrate on the differences in relation to the exemplary embodiment shown in FIGS. 1-3, whereas for those defining characteristics that remain the same, reference is hereby made to the description relating to FIGS. 1-3. Analogous defining characteristics have been provided with the same reference numerals, but with the letters a-e added to them in order to differentiate among the exemplary embodiments.

FIGS. 4a-4c each show an eccentric element 12b with an imbalance compensation element 10b that is integral to the eccentric element 12b. The imbalance compensation element 10b is comprised of a cylindrical outer casing 22b of the eccentric element 12b, the axis 20b of which outer casing is offset from the axis 24b in parallel fashion, specifically in a direction opposite from the direction of an axis 26b of a drive pin 38b. The offsetting of the axis 20b shifts a center of mass to the axis 24b.

FIGS. 5a-5c each show an eccentric element 12c with an imbalance compensation element 10c integral to the eccentric element 12c. The imbalance compensation element 10c is comprised of a cylindrical outer casing 22c of the eccentric element 12c, the axis 20c of which outer casing is tilted in relation to the axis 24c of an armature shaft 14c and to an axis 26c of a drive pin 38c of the eccentric element 12c. The tilting shifts a center of mass to the axis 24c and compensates for a tilting moment generated by the drive pin 38c and oriented perpendicular to the axis 24c.

FIGS. 6a-6c show another alternative eccentric element 12d with an imbalance compensation element 10d integral to the eccentric element 12d. The imbalance compensation element 10d has a cross section that changes in the axial direction (FIG. 6b). The imbalance compensation element 10d has two axially offset regions 28d, 30d, each of which constitutes a flattened region of an otherwise circular cross section of the eccentric element 12d. The flattened regions 28d, 30d are situated opposite from each other and generate a tilting moment, which in turn generates a tilting moment that is oriented perpendicular to an axis 24d of a bore provided to receive an armature shaft 14d and compensates in several planes for a tilting moment generated by a drive pin 38d of the eccentric element 12d. The regions 28d, 30d have different respective imbalances, each oriented opposite the other and of a different magnitude.

Figure 7:
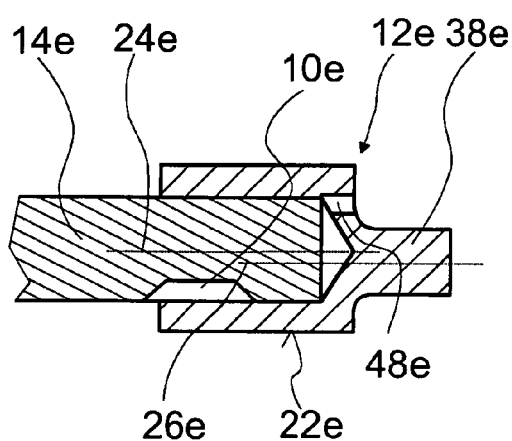
FIG. 7 shows another alternative eccentric element and an armature shaft with an integrated imbalance compensation element.

FIG. 7 shows another embodiment of the invention that has an imbalance compensation element 10e integral to an armature shaft 14e. The imbalance compensation element 10e is embodied in the form of a lateral flattened region of the armature shaft 14e.

What is claimed is:

1. An eccentric transmission, comprising:
   an armature shaft (14a-14e) having a rotation axis;
   an eccentric element (12a-12e) including an armature recess at one end for receiving and thereby fixedly connecting the armature shaft (14a-14e), a cylindrical drive pin (38a) on its other end and a recess in a form of a flattened area operating as an imbalance compensation element (10a-10e);
   at least one ball bearing (34a), which is coupled to and mounted upon the cylindrical drive pin (38a) of the eccentric element (12a-12e);
   an oscillating link (32a-32e) having a fork-shaped first end and a second end, wherein the fork-shaped first end is in coupling contact with both sides of an outer circumference of the at least one ball bearing (34a); and
   a drive shaft (16a-16e) that is non-rotatably connected to the second end of the oscillating link,
   wherein a center of mass of a total system comprising the eccentric element (12a-12e) and the at least one ball bearing lies on the rotation axis,
   wherein the eccentric element (12a-12e) rotates with the armature shaft (14a-14e) and converts, due to its own rotation during an operation mode, a revolving rotary motion of the armature shaft (14a-14e) into an oscillating rotary motion of the drive shaft (16a-16e) via the oscillating link (31a-32e) in order to drive an insertion tool (40a-40e) of a hand-held power tool (18a-18e) to oscillate, and
   wherein the imbalance compensation element (10a-10e) is a one-piece part of an additional functional unit (12a-12d, 14e).

2. The eccentric transmission as recited in claim 1, wherein the additional functional unit is the eccentric element (12a-12d).

3. The eccentric transmission as recited in claim 1, wherein the imbalance compensation element (10b, 10c) is composed of an outer casing (22b, 22c) of the eccentric element (12b, 12c).

4. The eccentric transmission as recited in claim 3, wherein an axis (20c) of the outer casing (22c) is tilted in relation to at least one axis (24c, 26c) of the eccentric element (12c).

5. The eccentric transmission as recited in claim 1, wherein the eccentric element (12a-12e) is provided to be press-fitted onto the armature shaft (14a-14e).

6. The eccentric transmission as recited in claim 1, wherein the imbalance compensation element (10d) has a cross section that changes in the axial direction.

7. The eccentric transmission as recited in claim 1, wherein the imbalance compensation element (10d) has at least two axially offset regions (28d, 30d), each with a different imbalance.

8. The eccentric transmission as recited in claim 1, wherein the additional functional unit is the armature shaft (14e) of an electric motor (36e).

9. The eccentric transmission as recited in claim 8, wherein the imbalance compensation element (10e) includes a recess in the armature shaft (14e).

10. The eccentric transmission as recited in claim 9, wherein the imbalance compensation element (10e) includes a lateral flattened region of the armature shaft (14e).

11. A hand-held power tool equipped with an eccentric transmission as recited in claim 1.

12. The eccentric transmission as recited in claim 1, wherein the eccentric element (12a-12e) has an opening (48a-48e), for letting air escape from the recess.

13. The eccentric transmission as recited in claim 1, wherein the eccentric element (12a-12e) and the armature shaft (14a-14e) rotate about a same axis.

14. The eccentric transmission as recited in claim 1, wherein the armature shaft (14a-14e) and the drive shaft (16a-16e) are substantially arranged perpendicular to each other.

15. The eccentric transmission as recited in claim 1, wherein the armature shaft (14a-14e) and the oscillating link (32a-32e) are parallel to each other in at least one operation mode of the eccentric transmission.

16. The eccentric transmission as recited in claim 1, wherein the oscillating link (32a-32e) is fork-shaped, rests against both sides of an outer circumference of the ball bearing (34a-34e) and is non-rotatably connected to the drive shaft (16a-16e).

17. The eccentric transmission as recited in claim 1, wherein the drive shaft (16a-16e) is supported in a housing of the hand-held power tool (18a-18e) by a ball bearing (46a-46e).

18. The eccentric transmission as recited in claim 1, wherein the eccentric element comprises a cylindrical drive pin being arranged in a front region of the eccentric element.

19. The eccentric transmission as recited in claim 18, wherein in a mounted state the at least one ball bearing is slid onto the cylindrical drive pin.

20. The eccentric transmission as recited in claim 18, wherein an axis of the cylindrical drive pin is offset eccentrically and in a parallel fashion to the rotation axis.

21. An eccentric transmission, comprising:
an armature shaft (14a-14e) having a rotation axis;
an eccentric element (12a-12e) including an armature recess at one end for receiving and thereby fixedly connecting the armature shaft (14a-14e), a cylindrical drive pin (38a) on its other end and a recess in a form of a flattened area operating as an imbalance compensation element (10a-10e);
at least one ball bearing (34a), which is coupled to and mounted upon the cylindrical drive pin (38a) of the eccentric element (12a-12e);
an oscillating link (32a-32e) having a fork-shaped first end and a second end, wherein the fork-shaped first end is in coupling contact with both sides of an outer circumference of the at least one ball bearing (34a); and
a drive shaft (16a-16e) that is non-rotatably connected to the second end of the oscillating link,
wherein a center of mass of a total system comprising the eccentric element (12a-12e) and the at least one ball bearing lies on the rotation axis,
wherein the eccentric element (12a-12e) converts in an operation mode a revolving rotary motion of the armature shaft (14a-14e) into an oscillating rotary motion of the drive shaft (16a-16e) via the oscillating link (32a-32e) in order to drive an insertion tool (40a-40e) of a hand-held power tool (18a-18e) to oscillate,
wherein the imbalance compensation element (10a-10e) is a one-piece part of an additional functional unit (12a-12d, 14e), and
wherein an axis (20c) of the outer casing (22c) is tilted in relation to at least one axis (24c, 26c) of the eccentric element (12c).

22. An eccentric transmission, comprising:
an armature shaft (14a-14e) having a rotation axis;
an eccentric element (12a-12e) including an armature recess at one end for receiving and thereby fixedly connecting the armature shaft (14a-14e), a cylindrical drive pin (38a) on its other end and a recess in a form of a flattened area operating as an imbalance compensation element (10a-10e);
at least one ball bearing (34a), which is coupled to and mounted upon the cylindrical drive pin (28a) of the eccentric element (12a-12e);
an oscillating link (32a-32e) having a fork-shaped first end and a second end, wherein the fork-shaped first end is in coupling contact with both sides of an outer circumference of the at least one ball bearing (34a); and
a drive shaft (16a-16e) that is non-rotatably connected to the second end of the oscillating link,
wherein a center of mass of a total system comprising the eccentric element (12a-12e) and the at least one ball bearing lies on the rotation axis,
wherein the eccentric element (12a-12e) converts in an operation mode a revolving rotary motion of the armature shaft (14a-14e) into an oscillating rotary motion of the drive shaft (16a-16e) via the oscillating link (32a-32e) in order to drive an insertion tool (40a-40e) of a hand-held power tool (18a-18e) to oscillate,
wherein the imbalance compensation element (10a-10e) is a one-piece part of an additional functional unit (12a-12d, 14e), and
wherein the additional functional unit is the armature shaft (14e) of an electric motor (36e).

23. The eccentric transmission as recited in claim 22, wherein the imbalance compensation element (10e) includes a recess in the armature shaft (14e).

24. The eccentric transmission as recited in claim 23, wherein the imbalance compensation element (10e) includes a lateral flattened region of the armature shaft (14e).

25. An eccentric transmission, comprising:
an armature shaft (14a-14e) having a rotation axis;
a ball bearing (34a-34e)

an eccentric element (12a-12e) including an armature recess at one end for receiving and thereby fixedly connecting the armature shaft (14a-14e), a cylindrical drive pin (38a) on its other end and a recess in a form of a flattened area operating as an imbalance compensation element (10a-10e), wherein the eccentric element (12a-12e) is coupled to the ball bearing (34a-34e) via the cylindrical drive pin (38a);

an oscillating link (32a-32e) having a fork-shaped first end and a second end, wherein the fork-shaped first end is in coupling contact with both sides of an outer circumference of the at least one ball bearing (34a); and a drive shaft (16a-16e) that is non-rotatably connected to the second end of the oscillating link, wherein a center of mass of a total system comprising the eccentric element (12a-12e) and the ball bearing lies on the rotation axis, wherein the eccentric element (12a-12e) rotates with the armature shaft (14a-14e) and converts, due to its own rotation during an operation mode, a revolving rotary motion of the armature shaft (14a-14e) into an oscillating rotary motion of the drive shaft (16a-16e) via the oscillating link (31a-32e) in order to drive an insertion tool (40a-40e) of a hand-held power tool (18a-18e) to oscillate, wherein the imbalance compensation element (10a-10e) is a one-piece part of an additional functional unit (12a-12d, 14e), and wherein the oscillating link (32a-32e) is fork-shaped, rests against both sides of an outer circumference of the ball bearing (34a-34e) and is non-rotatably connected to the drive shaft (16a-16e).

* * * * *